No. 862,266. PATENTED AUG. 6, 1907.
A. MESTITZ.
FILTER FOR DUST SUCTION APPARATUS.
APPLICATION FILED FEB. 19, 1906.
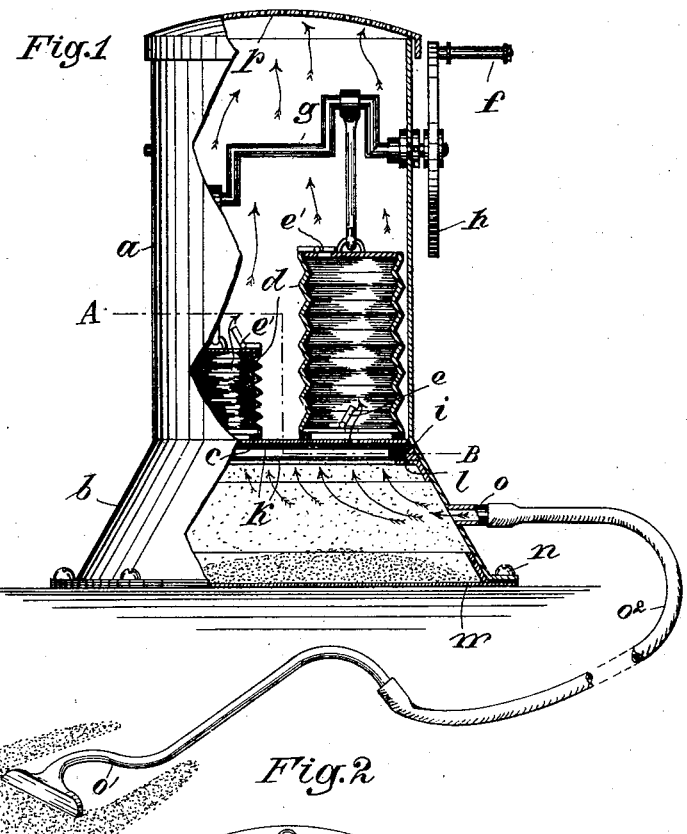
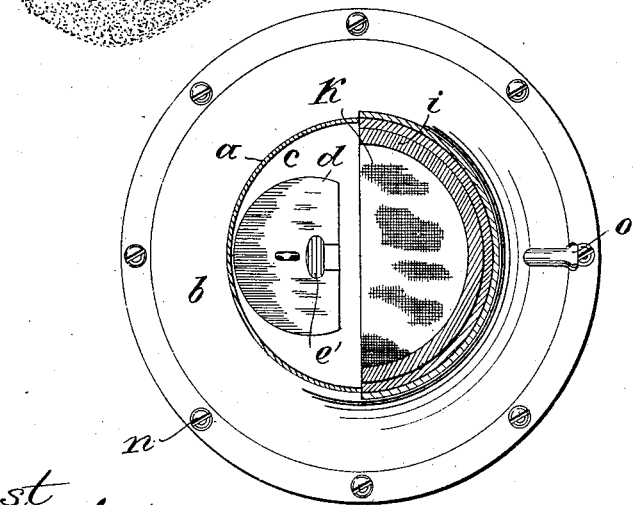
Attest
Edward N. Sartin
R. E. Ourand
Inventor
Arthur Mestitz
by
Spear, Middleton, Donaldson + Spear
Attys.

UNITED STATES PATENT OFFICE.

ARTHUR MESTITZ, OF RAUDNITZ, AUSTRIA-HUNGARY.

FILTER FOR DUST-SUCTION APPARATUS.

No. 862,266.     Specification of Letters Patent.     Patented Aug. 6, 1907.

Application filed February 19, 1906. Serial No. 301,959.

*To all whom it may concern:*

Be it known that I, ARTHUR MESTITZ, a subject of the Emperor of Austria, and a resident of Raudnitz-on-the-Elbe, Bohemia, in the Empire of Austria-Hungary, have invented a new and useful Improvement in Filters for Dust-Suction Apparatus, of which the following is a full, clear, and exact description.

This invention relates to a filter used in dust apparatus for cleaning the suction air of the dust it contains. The novel feature of the filter consists therein that immediately underneath the sucking-pump there are stretched out dust-proof fabrics, which are put into vibrating motion during the working of the pump and thereby shake off the dust which may have collected in the meshes of the fabric, so that it is not possible for the filtering fabric to become obstructed, and consequently ineffective.

In the accompanying drawing Figure 1 is a longitudinal section through a dust-suction apparatus fitted out with the new filter, Fig. 2 a section on the line A—B of Fig. 1.

The dust suction apparatus which is shown together with the filter in the drawing, in order to better explain the working of the filter, consists, as already known, of a covering receptacle $a$ placed upon the hollow socle or stand $b$. On the intermediate bottom $c$ is mounted the sucking-pump which consists of two sucking-bellows $d, d$ of the form of concertinas, provided with return-valves or inlets and outlets respectively $e, e'$, for producing the suction. The sucking-bellows $d, d$ can be actuated by means of a fly-wheel $h$ on the crank shaft $g$. Immediately below the bottom $c$ a frame $i$ is located on which fine-meshed fabric $k$ is stretched on both sides and which rests on a collar $l$ and is moreover made dust-proof by means of putty. Several of these frames $i$ may be arranged one above the other. The hollow stand $b$ is closed at the bottom by a plate-like dust-receptacle $m$ fastened to the same by means of screws $n$. Stand $b$ and the receptacle $m$ form together a space which is airtightly closed on all sides, and which may be called the "dusting-chamber." To the socket $o$ is connected the leather-pipe $o^2$, which conveys the air charged with dust from the suction-nozzle $o'$ to the apparatus. The lid $p$, which closes the vessel $a$ at the top, is perforated like a sieve.

When the sucking-pump $d, d$ is set to work the filtering fabrics $k$ are put into a continuous vibrating motion in consequence of the alternate action of the sucking-bellows, and in consequence of this shaking, the dust which collects in the filtering fabrics when the sucking-air passes through it, is shaken off at once. This prevents the dust from settling in the meshes of the filtering fabric, and thereby any obstruction of the latter. The dust falling from the fabrics $k$ collects in the receptacle $m$, from which it can be easily removed by screwing the same off the socle $b$. The air entering the sucking-bellows $d, d$ through the inlets $e$, and which does no longer contain, any dust, is ejected through the outlets $e'$ into the receptacle $a$, and escapes through the openings in the lid $p$ into the open air.

There is still to be mentioned that in consequence of the peculiar arrangement of the filter in front of the sucking-bellows, and its being cleaned automatically as a result, there is gained the advantage that it never requires to be taken out of the apparatus or exchanged, for the purpose of being cleaned.

Having thus described my invention, what I claim as new, and desire to secure by Letters Patent is:—

1. In a dust suction apparatus, in combination, a suction pump, a dust-tight dust-chamber forming a stand therefor and communicating at the top therewith, and a filter located in the chamber immediately below the pump inlets, and comprising a frame on which fine-meshed fabric is stretched, substantially as described.

2. In a dust suction apparatus, in combination, a suction pump, a dust-tight dust-chamber forming a stand therefor and communicating at the top therewith, a shallow dust-receptacle located at the bottom of the chamber, and a filter located in the chamber immediately below the pump inlets, and comprising a frame on which fine-meshed fabric is stretched, substantially as described.

3. In a dust suction apparatus, in combination, a suction pump, a dust-tight dust-chamber forming a stand therefor and communicating at the top therewith, a shallow dust-receptacle located at the bottom of the chamber and detachably secured to the base thereof, and a filter located in the chamber immediately below the pump inlets, and comprising a frame on which fine-meshed fabric is stretched, substantially as described.

4. In combination in a dust suction apparatus, a suitable casing, flexible filtering material therein, means for discharging the dust laden air on one side of said filtering material and suction means applying the suction force intermittingly and at different points of the surface of the filtering means, substantially as described.

In witness whereof I have hereunto signed my name this 15th day of January, 1906, in the presence of two subscribing witnesses.

ARTHUR MESTITZ.

Witnesses:
ARTHUR SCHWEINBURG,
ARTHUR SCHURZ.